Patented Nov. 1, 1949

2,486,688

UNITED STATES PATENT OFFICE 2,486,688

METHOD OF DEODORIZING BENZENE HEXACHLORIDE

Howeth J. Thomas, Oakland, Raymond M. Stager, Albany, and Horace R. McCombie, Oakland, Calif., assignors to Shell Development Company, San Francisco, Calif., a corporation of Delaware No Drawing. Application April 26, 1948, Serial No. 23,394

8 Claims. (Cl. 260—648)

This invention is directed to a method for producing benzene hexachloride of improved quality, it being particularly concerned with a method for obtaining a substantially odor-free product.

Benzene hexachloride ($C_6H_6Cl_6$), a compound which may otherwise be termed 1,2,3,4,5,6-hexachlorocyclohexane, may be produced by any one of a variety of methods. Some involve direct chlorination of benzene or its partially chlorinated derivatives, while in others the desired product is obtained by a chloro-substitution reaction utilizing cyclohexane or a derivative such as mono- or dichlorocyclohexane, as the starting material. Whatever process be employed, the resulting product is composed of various isomers of which at least five are known.

Benzene hexachloride is employed primarily as an insecticide, and it has been determined that the insecticidal properties derive almost entirely from the gamma isomer. Unfortunately, this isomer normally comprises but from 5 to 15% of the crude benzene hexachloride reaction product, while the insecticidally inert alpha isomer is present in an amount of from 60 to 75%, with the beta and delta isomers making up substantially the balance of the composition. Although from the economy standpoint it would be desirable to achieve crude benzene hexachloride having a larger proportion of the gamma isomer, this deficiency is not as important as that relating to product odor.

Benzene hexachloride, by whatever method produced, possesses a characteristic odor which is sharp and somewhat acrid. While not so unpleasant as to appreciably interfere with the use, per se, of the product, this odor is unfortunately assimilated by the root or fruit of many of the plants to which the benzene hexachloride is applied, thereby imparting an unpleasant taste to such of these products as are edible. Apparently this odor is not that of any benzene hexachloride isomer. Although product impurities are thought to be responsible for the odor, it has never been identified with any known impurity. Some success has attended efforts heretofore made to remove this characteristic odor, particularly by employing one or another of various recrystallization techniques, but the problem has still not been solved, for unless the treatment is particularly severe, (as through utilization of repeated extraction steps with an attendant material loss in each), the odor is not destroyed but only diminished. Further, even in the case of the more efficient of such deodorizing treatments, the product tends to reacquire its characteristic odor on standing, though the reason for this is not as yet understood. In other words, while one or more odoriferous components may in large part be removed from the crude benzene hexachloride material by known processes, there still remain other compounds capable of giving rise to said components either by decomposition or otherwise.

It is therefore a general object of the present invention to provide a method of deodorizing benzene hexachloride, the method being applicable either to the crude product, by whatever method produced, or to a refined grade of the material.

A more particular object is to provide a method whereby benzene hexachloride of characteristic odor may be deodorized as well as stabilized against subsequent deterioration in odor.

Still another object is to provide a method whereby the foregoing objects may be achieved while at the same time effecting the separation of a substantial part of the alpha isomer from the other isomers present in crude benzene hexachloride products.

It is our discovery that by maintaining benzene hexachloride of characteristic odor in an oil bath heated to between 80 and 150° C., and preferably between 100 and 120° C., the odoriferous fraction of the benzene hexachloride is evolved in vapor form along with other vapors from the oil itself. Further, it is believed that the compounds responsible for the subsequent production of an odoriferous fraction in the material are also converted into vapor form and discharged with the other gases. By continuing the treatment until evolution of gases, particularly those of an acrid character, is complete, it is possible to produce an odorless, stable, benzene hexachloride material even when starting with crude benzene hexachloride of the poorest odor. Further, by using a volume of oil insufficient to dissolve all the benzene hexachloride under treatment, it is possible to separate from the material a large portion of its alpha isomer in the form of an insoluble fraction, thereby obtaining a solution which is much richer in gamma isomer than is the case when the bath components are so proportioned as to bring all the benzene hexachloride into solution.

The oil employed as the bath liquid in the practice of the present invention is made up in major portion, and preferably entirely, of liquid hydrocarbons boiling within the range of approximately 110 to 400° C., i. e., from slightly below the boiling point of mineral spirits to a temperature approximating the boiling point of various lubricating oils and fractions thereof. Preferably the oil is a mixture of hydrocarbons and is of petroleum origin. As suitable bath liquids there may be mentioned kerosene and any of the liquids generally designated as fuel oils, though other blends of petroleum fractions may also be used. Oils of the type here specified are characterized by a substantial vapor loss at the temperatures recommended above for treating the benzene hexachloride (i. e. 80 to 150° C.) and it is believed that this oil vapor loss is in some way associated with the discharge from the bath of the odoriferous and incipient odoriferous components of the added benzene hexachloride. Other factors may, however, be involved. For example, it seems quite possible that the oil may react with the undesired benzene hexachloride components with the result that their characteristic odor is lost. Whatever the explanation, the oil treatment here disclosed is extremely effective for the permanent deodorization of all types and grades of benzene hexachloride.

As indicated above, the oil bath employed in the process of this invention should be maintained at a temperature between 80 and 150° C., and preferably between 100 and 120° C., in order to achieve effective deodorization of the benzene hexachloride, though the bath temperature should always be kept below the boiling point of the oil in order to avoid excessive oil losses. The period of treatment at such temperatures will vary somewhat depending on a variety of factors, including the concentration of the benzene hexachloride in the oil, its purity, and the makeup of the oil itself. For example, the heating period may be as short as 30 minutes when handling relatively small quantities of comparatively pure benzene hexachloride, though this period can be as long as 10 or more hours under less favorable conditions. In some cases the treating period can be reduced by bubbling air, nitrogen or other gas through the bath. In any event, it is to be noted that as treatment of the benzene hexachloride in the hot oil progresses, acrid fumes, accompanied by vapors from the oil itself, are evolved. Such evolution gradually diminishes, and when it is plain that any further vapor loss is distinctly non-acrid in character, the treatment is deemed complete and the bath may be cooled. However, the heating may be continued beyond this stage for any desired length of time without harmful results. In general, heating periods of from 1 to 7 hours are satisfactory in removing the odor from crude benzene materials when the bath is maintained at temperatures of from 100 to 120° C.

Unless the oil in the bath is to be utilized to effect partial separation of the alpha isomer, the proportions in which the benzene hexachloride and oil are admixed are not critical, for deodorization will proceed equally well no matter whether the material under treatment is all dissolved or is also present as a separate undissolved phase. In fact, even heavy slurries, as those obtained on the mixing of from 5 to 10 parts of benzene hexachloride for each part of oil, may be successfully treated through a practice of the method here described. However, when separation of the alpha isomer is desired, then the quantity of benzene hexachloride added should be in excess of any amount capable of going into solution in the oil at the desired separation temperature. Thus, for example, though an oil of the kerosene type is normally capable of dissolving from about 30 to 40% of crude benzene hexachloride at 100° C., by mixing 125 parts of a crude benzene hexachloride material (69.7% alpha, 7% beta, 13.9% gamma and 9.4% delta isomer) with 100 parts kerosene at 100° C., there will separate approximately 65 parts of an undissolved fraction containing 55 parts of the alpha isomer and only 1.5 parts of the insecticidally significant gamma isomer. From this it will be seen that at a sacrifice of less than 10% of the gamma isomer originally present there is obtained a solution whose solute portion is made up of approximately 26% of the gamma isomer instead of 13.9% as would have been the case were all the benzene hexachloride to have been dissolved.

Whether any undissolved benzene hexachloride is separated from the solution or not, the dissolved fraction may, if desired, in large part be precipitated by cooling the solution to a relatively low temperature (0 ± 10° C.). Recovery by this cooling technique may be made substantially complete if the oil employed is first saturated with benzene hexachloride at the low temperature where separation is to be effected. While such a pre-saturated bath will obviously be capable of dissolving a somewhat lesser quantity of newly added benzene hexachloride than would otherwise be the case, this fact becomes insignificant when the same oil is repeatedly used with successive batches of untreated benzene hexachloride. In any event, the method of pre-saturation is recommended wherever the treated material is to be recovered from the oil in solid form instead of being left in the form of an oil solution. If desired, the method of separation by cooling from a pre-saturated oil solution may be coupled with a preliminary filtering step to remove any undissolved (largely alpha) portion of the added benzene hexachloride material. Thus, a suitable sequence of steps would be to saturate the oil with benzene hexachloride at 0° C., heat the bath to 100° C., supply the heated bath with an excess of benzene hexachloride over the amount capable of going into solution at 100° C., filter the hot solution to remove the undissolved (largely alpha- portion, maintain the bath at 100° C. until deodorization is complete, cool to 0° C., and then filter to remove benzene hexachloride coming out of solution at 0° C., the latter product being the one here desired.

The oil residues remaining after separating the bulk of any dissolved benzene hexachloride may readily be employed in the treatment of fresh amounts of untreated material. In some cases such oil residues may be employed without modification, though where the loss of light ends has been particularly severe, it is preferred that the residue be blended with an additional quantity of fresh oil, or with a stock similar to that lost through vaporization.

In a modification of this invention, benzene hexachloride may be introduced into a hot oil bath along with any quantity of excess benzene or other reactant whose boiling point is below the bath temperature. Under these conditions the bath serves not only to deodorize the benzene hexachloride, but also causes the benzene or other low-boiling additive to be flashed off. Such steps as these, where separation is effected by vaporizing one or more of the bath constituents may be allied with those of the type described above, where separation is based on the relative insolubility of one or more isomers. It should be noted, however, that when the oil bath is utilized to flash off benzene or a similar low-boiling constituent, greatly improved results are obtained when a gaseous current, as air or nitrogen, is either blown or bubbled through the bath, the introduction of said gas continuing at least until the low boiling constituent has been removed, and optionally being continued during any remaining portion of the deodorizing treatment.

The benzene hexachloride recovered from the oil bath, while free of its acrid odor, frequently possesses a somewhat "oily" odor due to the presence of a small amount of retained oil. This oil can readily be removed, if desired, by washing the material with an appropriate solvent. It is preferred to employ isopropyl alcohol previously saturated with benzene hexachloride to effect this washing step, for it has been discovered that not only does this solvent selectively dissolve any oil which may be present, but it in some cases effects further concentration of the gamma isomer by dissolving a portion of any added delta isomer at the expense of gamma isomer present in the pre-saturated wash liquid.

The following examples illustrate the manner in which this invention finds preferred embodiment.

Example I

In this operation it was desired to deodorize benzene hexachloride and concentrate the same with respect to its gamma isomer. Accordingly, 633 grams of crude benzene hexachloride containing 442 grams alpha, 44 grams beta, 87 grams gamma, and 60 grams delta isomers were added to 500 grams of an oil made up 90% kerosene and 10% of a light oil blending stock (B. P., 125 to 175° C.). While not all the benzene hexachloride dissolved, the entire mixture was nevertheless subjected to mechanical mixing in an open vessel for 7 hours, and during that period was maintained a temperature of approximately 100° C. The evolution of acrid fumes from the bath, while fairly rapid during the early stages of the heating, gradually diminished and finally ceased altogether some time before the heating was terminated.

The hot bath mixture was then filtered and a solid product made up of 273 grams alpha, 40 grams beta, 8 grams gamma, and 5 grams delta isomers, along with 22 grams of oil, was recovered. This product, while having a low gamma isomer content, nevertheless was free of any acrid odor and had utility for insecticidal purposes. The filtrate was then cooled to 5° C., and the solid phase which separated out during this cooling step was removed by filtering. Analysis disclosed this solid phase to be made up of 140 grams alpha, 5 grams beta, 62 grams gamma, and 31 grams delta isomers, along with 73 grams of oil. Disregarding the oil content, which was readily removed without loss of product by slurrying the same with isopropyl alcohol previously saturated with benzene hexachloride, it will be evident that this, the desired product, had a gamma isomer content of approximately 26% as compared with a gamma isomer concentration of but 13.9% in the crude benzene hexachloride starting material. While some of the gamma isomer remained dissolved in the oil, it is accounted for through reuse of the oil phase. The actual amount would have been greatly reduced had the oil employed been first saturated at 5° C. with benzene hexachloride.

The solid product recovered from the oil bath at 5° C. was free of the acrid odor which normally characterizes benzene hexachloride, and such odor did not develop even when the material was exposed to the atmosphere for a period of 6 months. The same was true of the portion of the product from which oil was removed by slurrying with pre-saturated isopropyl alcohol. From this it is clear that the hot oil treatment not only deodorized the material, but stabilized it against subsequent deterioration in odor as well.

Example II

In this operation 418 grams of crude benzene hexachloride were placed in 500 grams of the oil described in the Example I above, and the resulting mixture was heated at 100° C. for about 2 hours with mechanical stirring. The excess benzene hexachloride insoluble at 100° C. was then removed by filtering and found to weight 225 grams, it being largely made up of the alpha isomer and containing a small residual oil content. The filtrate was then cooled to 5° C. at which temperature it yielded, a crop of benzene hexachloride crystals weighing 193 grams. These crystals were free of the acrid odor which characterized the starting material, and no odor developed in them during a subsequent storage period of 6 months.

Example III

The crude benzene hexachloride material here to be treated was in form of a 28.8% solution in benzene. To 2057 grams of this solution in an open flask were added 714 grams of the oil described in Example I. The resulting mixture was then heated to 115° C. and maintained at that temperature for 6.5 hours. During this period air was continuously blown through the heated liquid, and the benzene present was rapidly vaporized and carried out of the flask along with the other vapors leaving the mixture.

The residual, benzene-free mixture was then cooled to 5° C. and the solid benzene hexachloride filtered off. This solid product, though possessing an oily odor, was substantially free of the acrid odor which characterized the starting material. The small amount of the oil retained by the solid, and which was responsible for the oily odor, was then removed by washing with isopropyl alcohol previously saturated with benzene hexachloride at room temperature. No odor was detectable in the product even after the same had been allowed to stand for several months exposed to the atmosphere.

Unless otherwise indicated, the various parts and percentages employed herein are expressed in terms of weight.

We claim as our invention:

1. The method of deodorizing benzene hexachloride, said method comprising mixing benzene hexachloride in a liquid hydrocarbon bath boiling between 110 and 400° C., and then heating the benzene hexachloride-containing bath at a temperature between 80 and 150° C., but below the boiling point of the bath, until evolution of acrid vapors from the bath is complete.

2. The method of claim 1 wherein said benzene hexachloride-containing bath is maintained at a temperature between 100 and 120° C. until evolution of acrid vapors from the bath is complete.

3. The method of claim 1 wherein a gas is bubbled through the benzene hexachloride-containing bath during the heating step.

4. The method of deodorizing benzene hexachloride, said method comprising introducing benzene hexachloride into an oil bath the major portion of which is made up of kerosene, and maintaining the benzene hexachloride-containing bath at a temperature between 100 and 120° C. until evolution of acrid vapors from the bath is complete.

5. The method of claim 4 wherein said benzene hexachloride-containing bath is maintained at a temperature between 100 and 120° C. for a period of from 1 to 7 hours.

6. The method of treating crude benzene hexachloride to free the same of its characteristic odor and to increase the relative gamma isomer concentration thereof, said method comprising introducing crude benzene hexachloride into a liquid hydrocarbon bath boiling between 110 and 400° C. in an amount in excess of the amount capable of going into solution in the bath at a given temperature between 80 and 150° C., bringing the benzene hexachloride-containing bath to said given temperature, filtering off the undissolved benzene hexachloride, maintaining the resulting filtrate within the temperature range 80 to 150° C. until evolution of acrid vapors therefrom is complete, cooling the filtrate to precipitate dissolved benzene hexachloride, and filtering off the precipitated benzene hexachloride, said precipitate being gamma isomer-rich as compared with the crude benzene hexachloride starting material and being free of the acrid odor which characterized said starting materials.

7. The method of claim 6 wherein there is added the step of washing the gamma isomer-rich benzene hexachloride precipitate with isopropyl alcohol to free said precipitate of any oily odor.

8. The method of treating crude benzene hexachloride to free the same of its characteristic odor and to increase the relative gamma isomer concentration thereof, said method comprising introducing crude benzene hexachloride into a liquid hydrocarbon bath boiling between 110 and 400° C. in an amount in excess of the amount capable of going into solution in the bath at a given temperature between 100 and 120° C., bringing the benzene hexachloride-containing bath to said given temperature, filtering off the undissolved benzene hexachloride, maintaining the resulting filtrate within the temperature range 100 to 120° C. until evolution of acrid vapors therefrom is complete, cooling the filtrate to precipitate dissolved benzene hexachloride, and filtering off the precipitated benzene hexachloride, said precipitate being gamma isomer-rich as compared with the crude benzene hexachloride starting material and being free of the acrid odor which characterized said starting materials.

HOWETH J. THOMAS.
RAYMOND M. STAGER.
HORACE R. McCOMBIE.

REFERENCES CITED

The following references are of record in the file of this patent:

UNITED STATES PATENTS

| Number | Name | Date |
|---|---|---|
| 2,438,900 | Cooke et al. | Apr. 6, 1948 |

FOREIGN PATENTS

| Number | Country | Date |
|---|---|---|
| 471,941 | Belgium | Apr. 19, 1945 |